United States Patent
Sugitani et al.

(10) Patent No.: US 7,174,981 B2
(45) Date of Patent: Feb. 13, 2007

(54) AIR INTAKE DEVICE FOR SCOOTER-TYPE TWO-WHEELED MOTOR VEHICLE

(75) Inventors: Tsuyoshi Sugitani, Shizuoka-ken (JP); Fumiyasu Sugiyama, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 16 days.

(21) Appl. No.: 10/508,484

(22) PCT Filed: Jun. 13, 2003

(86) PCT No.: PCT/JP03/07584

§ 371 (c)(1),
(2), (4) Date: Sep. 20, 2004

(87) PCT Pub. No.: WO03/106834

PCT Pub. Date: Dec. 24, 2003

(65) Prior Publication Data

US 2005/0145427 A1 Jul. 7, 2005

(30) Foreign Application Priority Data

Jun. 17, 2002 (JP) ............................. 2002-175510

(51) Int. Cl.
*B60K 11/00* (2006.01)
*B60K 13/02* (2006.01)

(52) U.S. Cl. ..................... 180/68.1; 180/68.3; 180/219

(58) Field of Classification Search ................ 180/229, 180/219, 68.1, 68.2, 835, 68.3; 123/54.4, 123/308, 198 E, 196 AB, 41.49
See application file for complete search history.

(56) References Cited

U.S. PATENT DOCUMENTS

D243,236 S * 2/1977 Vachon et al. ............. D12/114

(Continued)

FOREIGN PATENT DOCUMENTS

EP            707141          4/1996

(Continued)

*Primary Examiner*—Hau Phan
(74) *Attorney, Agent, or Firm*—Hogan & Hartson LLP

(57) ABSTRACT

A first air cleaner box (25) is provided on one side of a rear wheel (4) above a transmission case (9) of a unit-swinging power train unit (1), whereas a second air cleaner box (26) is provided on the other side of the rear wheel (9). Air compartments (40) of the air cleaner boxes (25, 26) are connected to a throttle valve (22) while the air compartments of the air cleaner boxes are made to communicate with each other. The second air cleaner box (26) can be provided by making use of a dead space defined on a side of the rear wheel (4). The capacity of the air compartment (40) can be increased by the first and second air cleaner boxes (25, 26) while preventing the enlargement of the vehicle body, whereby the output of an engine (3) can be increased by increasing the displacement of the engine (3).

20 Claims, 6 Drawing Sheets

U.S. PATENT DOCUMENTS

| | | | | |
|---|---|---|---|---|
| 4,671,216 A | * | 6/1987 | Itoh | 123/198 E |
| 5,203,299 A | * | 4/1993 | Ueka | 123/308 |
| 5,433,286 A | * | 7/1995 | Kumamaru et al. | 180/219 |
| 5,560,446 A | | 10/1996 | Onishi | |
| 5,918,576 A | * | 7/1999 | Ohoka et al. | 123/198 E |
| 6,601,667 B2 | * | 8/2003 | Buell et al. | 180/229 |
| 6,615,945 B2 | * | 9/2003 | Minami et al. | 180/219 |
| 6,644,693 B2 | * | 11/2003 | Michisaka et al. | 280/835 |
| 6,682,450 B2 | * | 1/2004 | Mukai et al. | 474/15 |
| 6,708,652 B2 | * | 3/2004 | Oki | 123/41.49 |
| 6,910,546 B2 | * | 6/2005 | Tsutsumi et al. | 180/219 |
| 6,971,438 B2 | * | 12/2005 | Oki et al. | 123/196 AB |

FOREIGN PATENT DOCUMENTS

| | | |
|---|---|---|
| JP | 49-143606 | 12/1974 |
| JP | 60-131317 | 7/1985 |
| JP | 62-83798 | 5/1987 |
| JP | 4-103480 | 4/1992 |
| JP | 08-108877 | 4/1996 |
| JP | 08-114122 | 5/1996 |
| JP | 08-114123 | 5/1996 |
| JP | 08-114125 | 5/1996 |
| JP | 2001-234824 | 8/2001 |

* cited by examiner

AIR INTAKE DEVICE FOR SCOOTER-TYPE TWO-WHEELED MOTOR VEHICLE

BACKGROUND OF THE INVENTION

1. Technical Field

The present invention relates to a scooter-type motorcycle intake device in which an air cleaner box is provided on each side of a rear wheel.

2. Background Art

Conventionally, in a scooter-type motorcycle (hereinafter, referred simply to as scooter), a unit-swinging power train unit having an engine and a rear wheel is attached to a vehicle body frame in such a manner as to swing vertically. In a longitudinal direction of the scooter, a front end part of the power train unit is constituted by an engine, and a rear wheel supporting transmission case is attached integrally to a crankcase of the engine. A front end part of the engine is supported on the vehicle body frame in such a manner as to swing, and a rear end part of the transmission case is connected to the vehicle body frame via a cushion unit.

The transmission case is constructed so as to extend longitudinally on a left-hand side of the rear wheel, and power transmission devices for transmitting the drive of the engine to the rear wheel such as a V-belt type automatic transmission and a centrifugal clutch are incorporated therein.

An intake device that is provided on this type of power train unit adopts a construction in which intake air is induced from an air cleaner box provided above the transmission case into a cylinder through a carburetor above the crankcase.

The interior of the air cleaner box is partitioned into an upstream-side air compartment and a downstream-side air compartment by an air cleaner element, and a fresh air inlet is opened in the upstream-side air compartment, whereas the carburetor is connected to the downstream-side air compartment via an intake duct.

Incidentally, in the conventional intake device that has been described above, since the capacity of the air cleaner box is small, there has existed a limitation on the attempt to increase the output of the engine by increasing the displacement thereof. Namely, this is because, when attempting to increase the amount of intake air by increasing the displacement of the engine, the flow of intake air in the air cleaner box gets faster, and this leads to an excessive increase in intake resistance.

While a drawback like this can be resolved by increasing the capacity of the air cleaner box, in the event that this resolution is adopted, the external shape of the air cleaner box is enlarged, whereby there is caused instead a problem that the vehicle body is made larger in size in association with the enlargement of the external shape of the air cleaner box.

SUMMARY OF THE INVENTION

The invention was made in view of the situations above, and an advantage thereof is to provide a scooter-type motorcycle intake device which can facilitate the increase in the output of an engine by increasing the displacement thereof while preventing the unnecessary enlargement of the vehicle body of a scooter-type motorcycle.

According to an embodiment of the present invention, there is provided a scooter-type motorcycle intake device including a first air cleaner box provided on one side of a rear wheel above a transmission case of a unit-swinging power train unit. A second air cleaner box is provided on the other side of the rear wheel so that each of the first and second air cleaner boxes overlaps to the rear wheel in a side view of the power train unit. Air compartments of the first and second air cleaner boxes are connected to a throttle valve while the air compartments of the air cleaner boxes are made to communicate with each other.

According to an embodiment to the present invention, the second air cleaner box can be provided by making use of a dead space defined on the side of the rear wheel. Consequently, the capacity of the air compartment can be increased by the first and second air cleaner boxes while preventing the enlargement of the vehicle body. Thus, there can be provided a scooter-type motorcycle intake device which can facilitate the increase in the output of the engine by increasing the displacement thereof.

According to an embodiment of the present invention, an air cleaner element may be provided in each of the first and second air cleaner boxes, and a fresh air inlet may be formed in an air compartment upstream of the air cleaner element in each of the air cleaner boxes, while an intake duct positioned between the two air cleaner boxes and extending from the throttle valve is connected to respective air compartments downstream of the air cleaner elements.

According to the construction, the first and second air cleaner boxes are made to have substantially the same construction, and the resistance generated when intake air flows becomes substantially equal over the two air cleaner boxes. Consequently, since intake air flows substantially uniformly in the two air cleaner boxes and a flow path of intake air can be divided into two in order to make effective use of each air cleaner element, the increase in intake resistance can be suppressed to as low a level as possible irrespective of the fact that the two air cleaner elements are provided.

In a first embodiment of the present invention, an air cleaner element may be provided in the first air cleaner box, a fresh air inlet may be formed in an air compartment upstream of the air cleaner element, and an air compartment downstream of the air cleaner element may be made to communicate with a second air cleaner box. The second air cleaner box is formed such that the interior thereof constitutes a closed space.

According to the construction, the capacity of the air compartment downstream of the air cleaner element in the first air cleaner box is increased by the capacity of the second air cleaner box. Due to this, since a large amount of air in the air cleaner boxes can be supplied to the engine without any resistance, when the opening of the throttle valve is increased, the response of the engine can be improved.

DETAILED DESCRIPTION OF THE INVENTION

Figure 1:
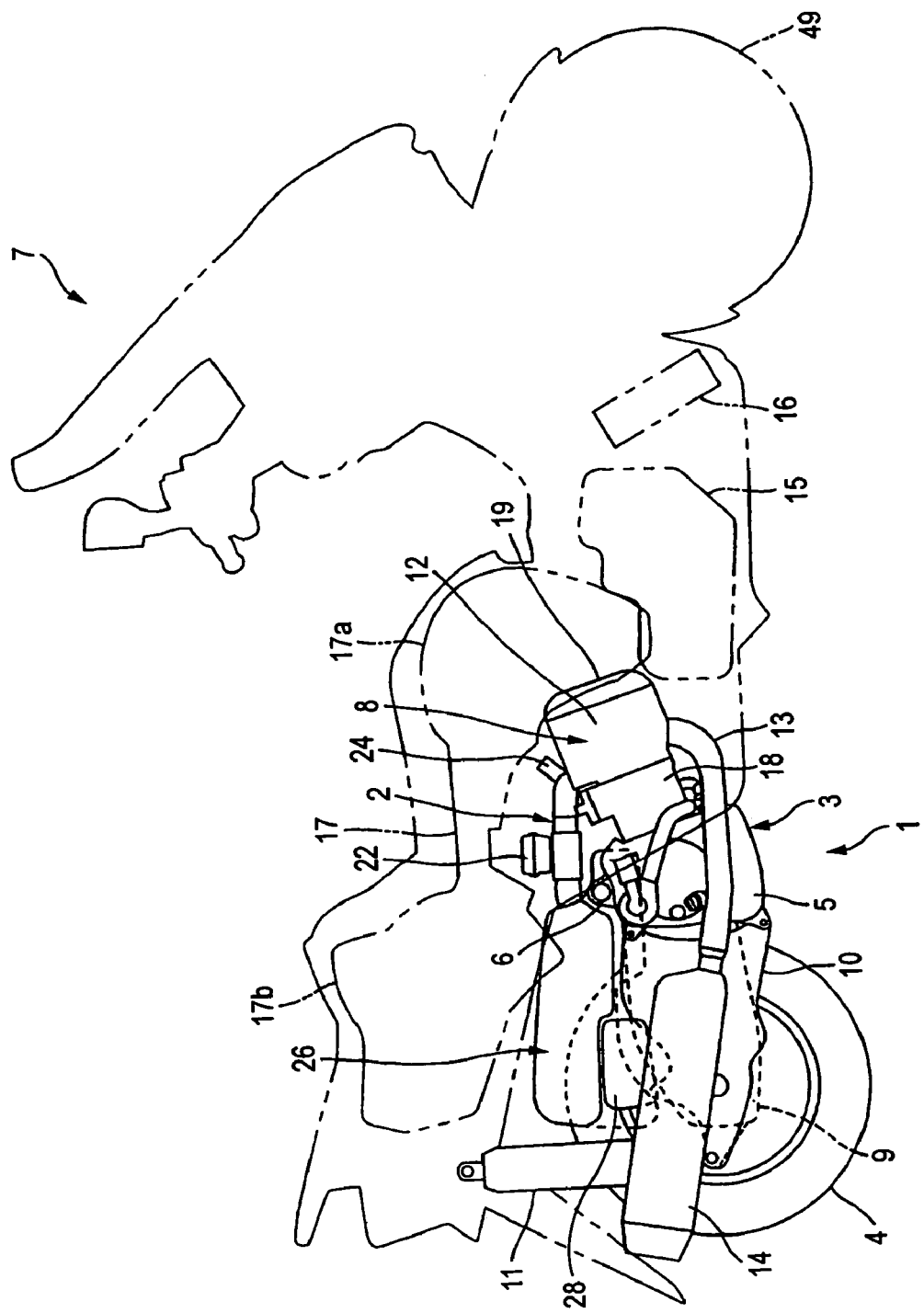
FIG. 1 is a right side view of a scooter unit-swinging power train unit provided with an intake device according to a first embodiment.

To describe the invention in more detail, the invention will be described with reference to the accompanying drawings.

(First Embodiment)

FIGS. 1 to 4 illustrate a first embodiment.

In the drawings, reference numeral 1 denotes a unit-swinging power train unit equipped with an intake device 2. This power train unit includes an engine 3 and a rear wheel 4 which are incorporated therein integrally. The power train unit 1 is supported on a vehicle body frame, not shown, of a scooter 7 via a link (not shown) coupled to a coupling boss 6 at an upper end portion of a crankcase 5 of the engine 3 in such a manner as to swing vertically. Note that when used in the following description, left and right indicate transverse directions of the scooter 7 when facing the front of the scooter 7.

Figure 2:
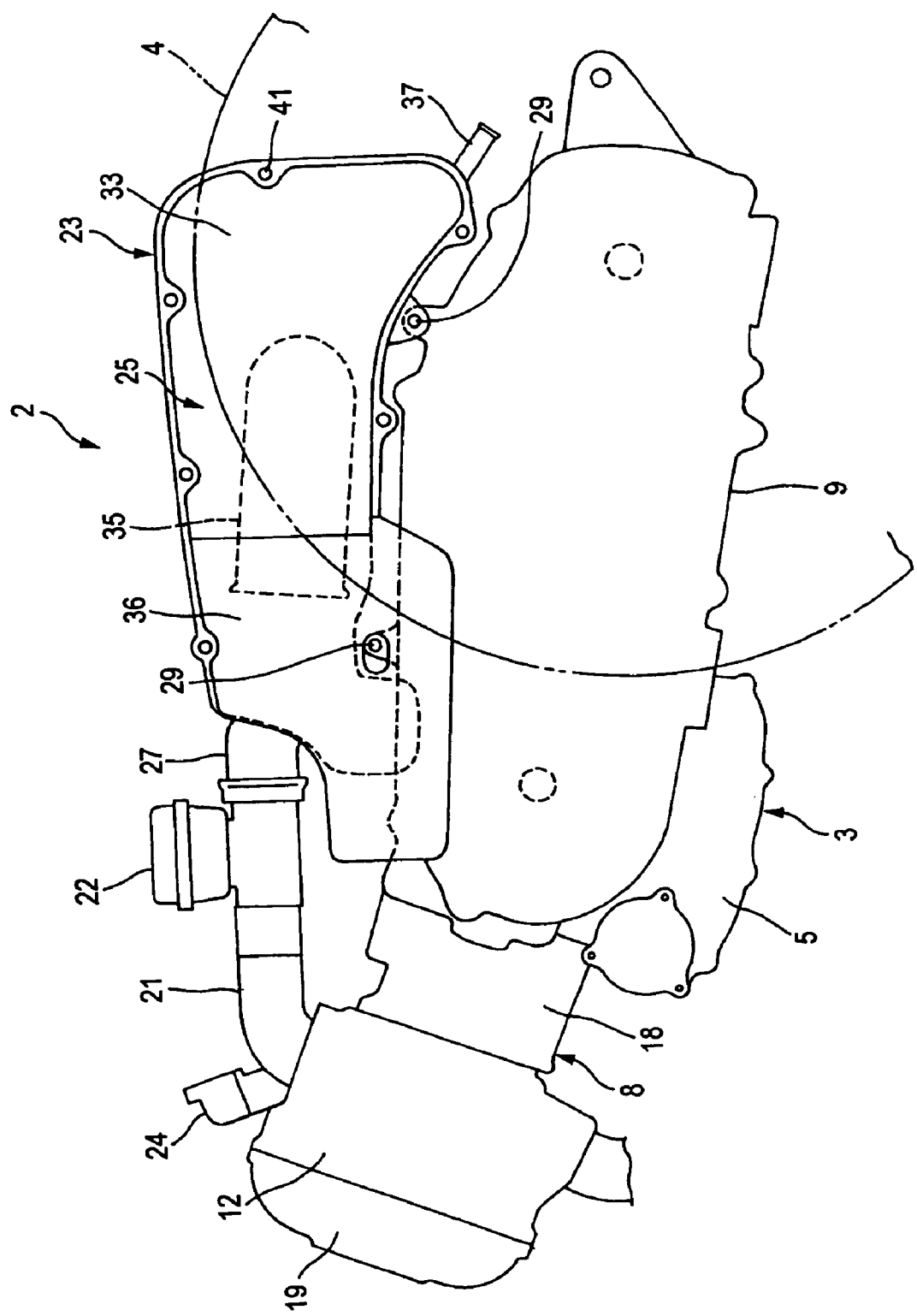
FIG. 2 is a left side view of the scooter unit-swinging power train unit provided with the intake device according to the first embodiment.

The engine 3 includes the crankcase 5 and a cylinder 8 which protrudes forward and upward from the crankcase 5, and a transmission case 9 which extends in the longitudinal direction is provided on a left-hand side of the rear wheel 4 (refer to FIG. 2). The rear wheel 4 is supported by the transmission case 9 and a rear arm 10 which extends rearward from the crankcase 5 on a right-hand side of the rear wheel 4. In addition, a rear end portion of the transmission case 9 and a rear end portion of the rear arm 10 are connected, respectively, to the vehicle body frame via a cushion unit 11.

As shown in FIGS. 1 and 2, the cylinder 8 extends in such a manner that an axis thereof inclines forward and upward, and an intake device 2, which will be described later on, is connected to an upper surface of a cylinder head 12 of the cylinder 8, while an exhaust pipe 13 is connected to a lower surface of the cylinder head 12. As shown in FIG. 1, the exhaust pipe 13 is provided to extend rearward from the cylinder head 12 in such a manner as to pass by a right-hand side of the crankcase 5 for connection to a muffler 14 on a right-hand side of the rear arm 10.

In FIG. 1, a fuel tank 15 is provided in front of the engine 3. In addition, a radiator 16 is disposed in front of the fuel tank 15. Furthermore, an accommodation box 17 is provided above the engine 3. This accommodation box 17 is constructed so as to accommodate therein two helmets (not shown), and an upper opening through which the helmets are placed in or taken out of the accommodation box 17 is closed and opened by a seat. Two helmet accommodating portions in the accommodation box 17 are denoted by reference numerals 17a, 17b. In addition, in FIGS. 1 and 2, the cylinder 8 includes a cylinder body 18 which protrudes forward and upward from the crankcase 15, the cylinder head 12 fixed to a front end of the cylinder body 18 and a cylinder head cover 19 which is fixed to a front end of the cylinder head 12.

Figure 3:
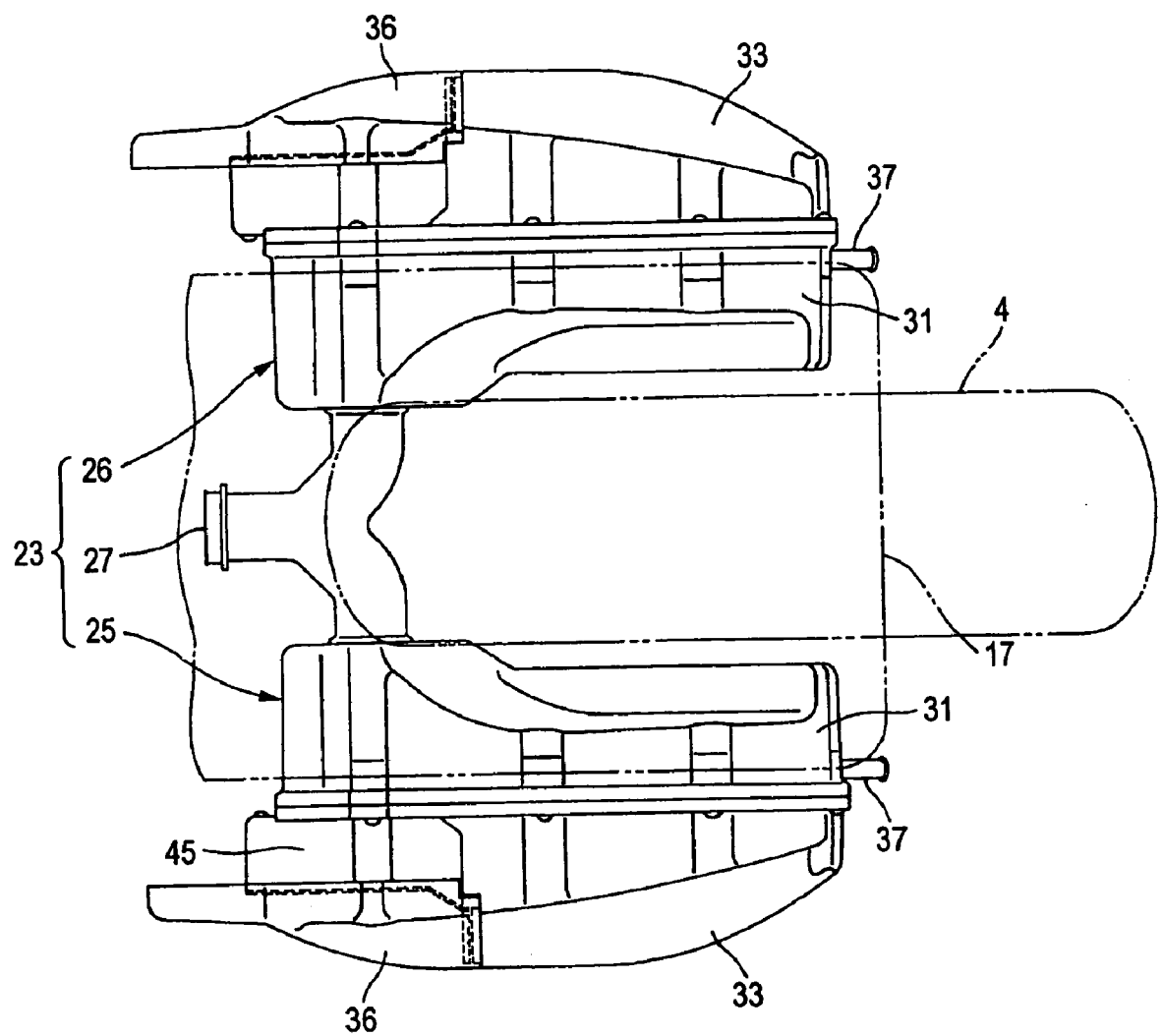
FIG. 3 is a plan view of air cleaner boxes according to the first embodiment.

As shown in FIGS. 2 and 3, the intake device 2 includes an intake manifold 21 provided to extend rearward from the cylinder head 12 in such a manner as to pass over the cylinder body 18, an throttle valve 22 connected to a downstream-side end portion of the intake manifold 21 and an air cleaner 23 connected to an intake air inlet of the throttle valve 22. An injector 24 for supplying fuel to the engine 3 is mounted on the intake manifold 21.

As shown in FIG. 3, the air cleaner 23 is made up of a first air cleaner box 25 positioned at an upper portion of the rear wheel 4 on the left-hand side thereof, a second air cleaner box 26 positioned at an upper portion of the rear wheel 4 on the right-hand side thereof and an intake duct 27 adapted not only to connect the first and second air cleaner boxes 25, 26 with each other but also to connect the two air cleaner boxes to the throttle valve 22.

While the first and second air cleaner boxes 25, 26 are different from each other in external shape resulting when viewed from the outside of a vehicle body, the two air cleaner boxes 25, 26 are configured so as to be symmetrical with each other in the transverse direction of the scooter 7. The reason why the external shapes of the two air cleaner boxes 25, 26 are different from each other is because the second air cleaner box 26 positioned on the right-hand side of the rear wheel 4 is formed, as shown in FIG. 1, such that a bottom of a rear end portion thereof is elevated in order to avoid the interference with the muffler 14 and a brake caliper 28.

The first air cleaner box 25 is disposed above the transmission case 9 as is seen with one used on a conventional scooter. As shown in FIG. 2, the air cleaner box 25 is fixed to the transmission case 9 with fixing bolts 29 at two locations at a lower end portion thereof and is supported on the throttle valve 22 via the intake duct 27 at a front end portion thereof.

The second air cleaner box 26 is disposed in a dead space defined on the right-hand side of the rear wheel 4. To be more specific, the air cleaner box 26 is disposed in the dead space defined above the muffler 14 and the brake caliper 28 and below the accommodation box 17. The air cleaner box 26 is fixed to the rear arm 10 with fixing bolts, not shown, at two locations at a lower end portion thereof and is supported on the throttle valve 22 via the intake duct 27 at a front end portion thereof.

These first and second air cleaner boxes 25, 26 are constructed so as to have substantially the same construction, and due to this, here, only the first air cleaner box 25 which is positioned on the left-hand side of the rear wheel 4 will be described in detail with reference to FIG. 4. Note that a direction in which air flows is indicated by arrows in FIG. 4.

Figure 4:
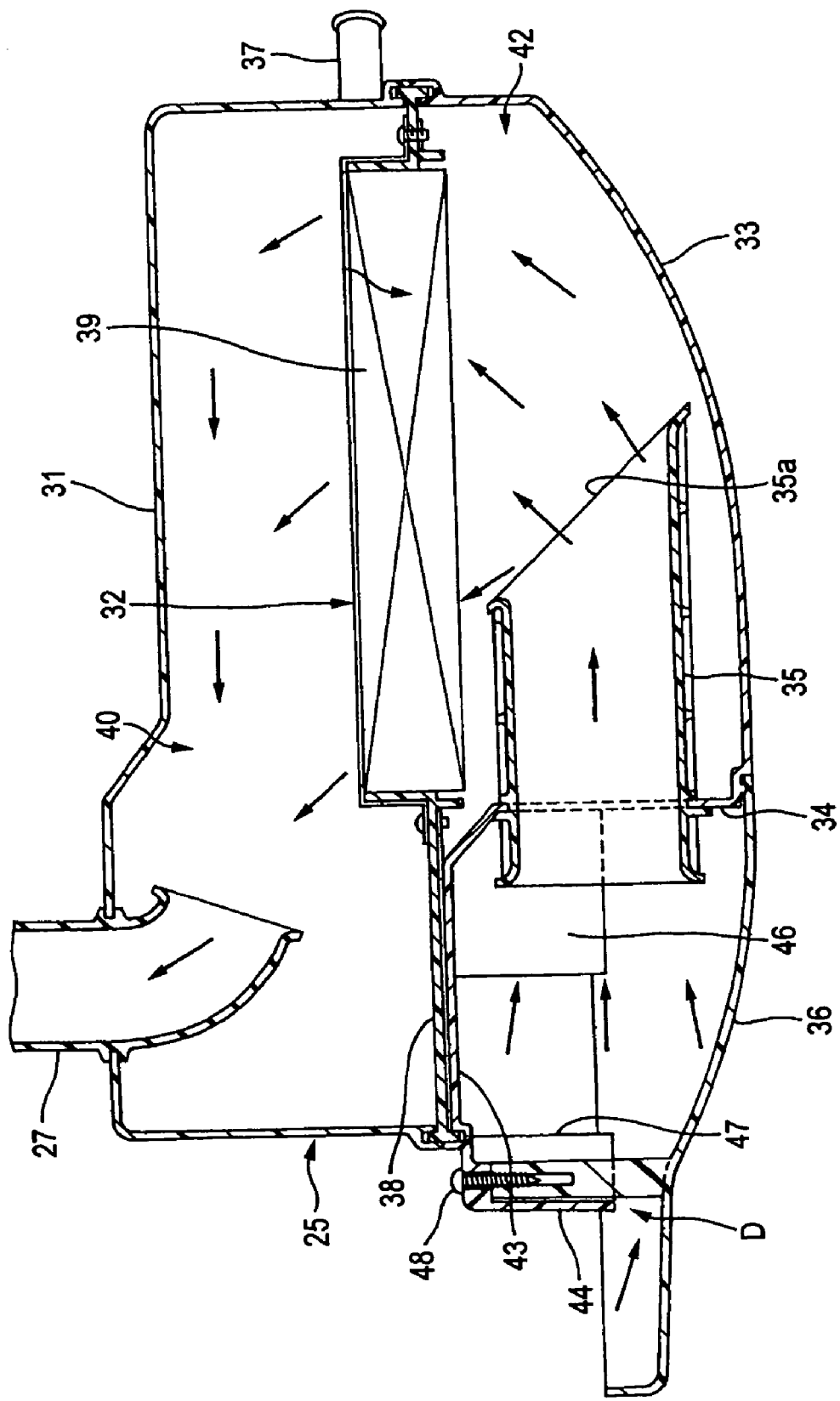
FIG. 4 is a horizontally cross-sectional view of a first air cleaner box according to the first embodiment.

The first and second air cleaner boxes 25, 26 are, as shown in FIG. 4, each made up of a downstream-side box 31 to which the intake duct 27 is attached, an upstream-side box 33 which holds an air cleaner element 32 in cooperation with the downstream-side box 31 therebetween, an air pipe 35 attached to a front wall 34 of the upstream-side box 33 and an air inlet cover 36 which is attached to a front end portion of the upstream-side box 33 to cover an upstream-side end portion of the air pipe 35.

The downstream-sidebox 31 is formed into a box-like shape which opens outwardly, and the intake duct 27 is attached to a front end portion of the downstream-side box 31 in such a manner as to pass thereinto. This intake duct 27 is made of rubber and formed into a Y-shape (refer to FIG. 3) as viewed from the top so that the angle of the air cleaner boxes 25, 26 can be changed easily when the rear wheel 4 is attached to or detached from the vehicle body. In addition, the intake duct 27 is disposed between the two air cleaner boxes 25, 26 and is connected to the two air cleaner boxes 25, 26 and the throttle valve 22. A drain pipe 37 is provided at a rear end portion of the downstream-side box 31 for discharging water which has entered the interior of the box.

A cap member, not shown, is put on the drain pipe 37 normally, and the cap member is removed at the time of maintenance.

The air cleaner element 32 is made up of a frame 38 which is held between the downstream-side box 31 and the upstream-side box 33 and an element main body 39 supported on this frame 38. The frame 38 is brought into engagement with the whole area of an open portion of the downstream-side box 31 and is held between the downstream-side box 31 and the upstream-side box 33 when the upstream-side box is attached to the downstream-side box 31. A downstream-side air compartment 40 is defined in the interior of the downstream-side box 31 when the air cleaner element 32 is attached to the downstream-side box 31. This downstream-side air compartment 40 is made to communicate with a downstream-side air compartment 40 in the second air cleaner box 26 and the air inlet of the throttle valve 22 via the intake duct 27.

The upstream-side box 33 is formed into a box-like shape which has an opening which confronts the opening portion (the portion where the air cleaner element 32 is mounted) of the downstream-side box 31. The air cleaner element 32 is attached to the downstream-side box 31 with attachment screws 41 (refer to FIG. 2) in such a manner as to be held between the upstream-side box 33 and the downstream-side box 31.

The upstream-side box 33 adopts a construction in which an upstream-side air compartment 42 is defined in a rear part of the upstream-side box 33 which confronts the element main body 39. In addition, as shown in FIGS. 3 and 4, a location of the upstream-side box 33 which is positioned forward of the element main body 39 is made up of a longitudinal plate 43 which confronts the frame 38 of the air cleaner element 32, a front plate 44 which extends outwardly from a front end and upper and lower ends of the longitudinal plate 43, an upper plate 45 (refer to FIG. 3) and a lower plate 46 (refer to FIG. 4). A cut-out 47 is formed in the lower plate 46.

The air pipe 35 attached to the upstream-side box 33 is provided in such a manner as to pass through the front wall 34 to extend longitudinally. In addition, an opening 35a in a downstream-side end portion of the air pipe 35 inclines in such a manner as to gradually extend outwardly as the pipe extends rearward. Due to this, air which passes through the air pipe 35 into the upstream-side air compartment 42 is scattered over a wide area in the longitudinal direction. A fresh air inlet port is constituted by this air pipe 35.

The air inlet cover 36 is formed so as to have a U-shaped cross section so that a front end portion of the upstream-side box 33 is surrounded both on sides and at the top and bottom thereof. As shown in FIG. 4, the air inlet cover 36 is attached to a front end portion of the upstream-side box 33 with attachment screw 48. In addition, a gap D is formed, as shown in FIG. 4, between the cover 36 and the front plate 44 of the upstream-side box 33 for inducing outside air into the air cleaner 23. Note that outside air is also induced into the air cleaner 23 from the cut-out 47 formed in the lower plate 46, in addition to the gap D. Thus, muddy water splashed up by a front wheel 49 (refer to FIG. 1) and rain water can be prevented from being picked up into the air cleaner 23 through the construction in which air is taken into the interior of the cover 36 from the relatively narrow gap D and the cut-out 47.

According to the scooter intake device 2 that has been constructed as described heretofore, the first air cleaner box 25 is provided above the transmission case 9 of the unit-swinging power train unit 1 and on the left-hand side of the rear wheel 4, the second air cleaner box 26 is provided on the right-hand side of the rear wheel 4, and the downstream-side air compartments 40 of the respective air cleaner boxes 25, 26 are made to communicate with each other and are connected to the throttle valve 22.

Due to this construction, the second air cleaner box 26 can be provided by making use of the dead space defined on the side of the rear wheel 4. Consequently, the capacity of the air compartment 40 can be increased by the first and second air cleaner boxes 25, 26 while preventing the enlargement of the vehicle body, thereby making it possible to provide a scooter-type motorcycle intake device which can easily enhance the output of the engine 3 by increasing the displacement of the engine 3.

In addition, the air cleaner element 32 is provided in each of the first air cleaner box 25 and the second air cleaner box 26, the fresh air inlet is formed in the upstream-side air compartment 42 positioned upstream of the air cleaner elements 32 in each of the two air cleaner boxes 25 and 26, and the intake duct 27 extending from the throttle valve 22 is connected to the downstream-side air compartment 40 positioned downstream of the air cleaner element 32 in each of the two air cleaner boxes 25, 26.

Due to this, the first and second air cleaner boxes 25, 26 are allowed to have substantially the same construction, and the resistance generated when air flows becomes substantially equal between the two air cleaner boxes 25, 26. Consequently, since a substantially uniform volume of air flows through both the air cleaner boxes 25, 26 and the intake air induction path can be divided into two so that the respective air cleaners 32 can be used effectively, the increase in intake resistance can be suppressed to as low a level as possible, irrespective of the fact that there are provided the two air cleaner elements 32.

Figure 5:
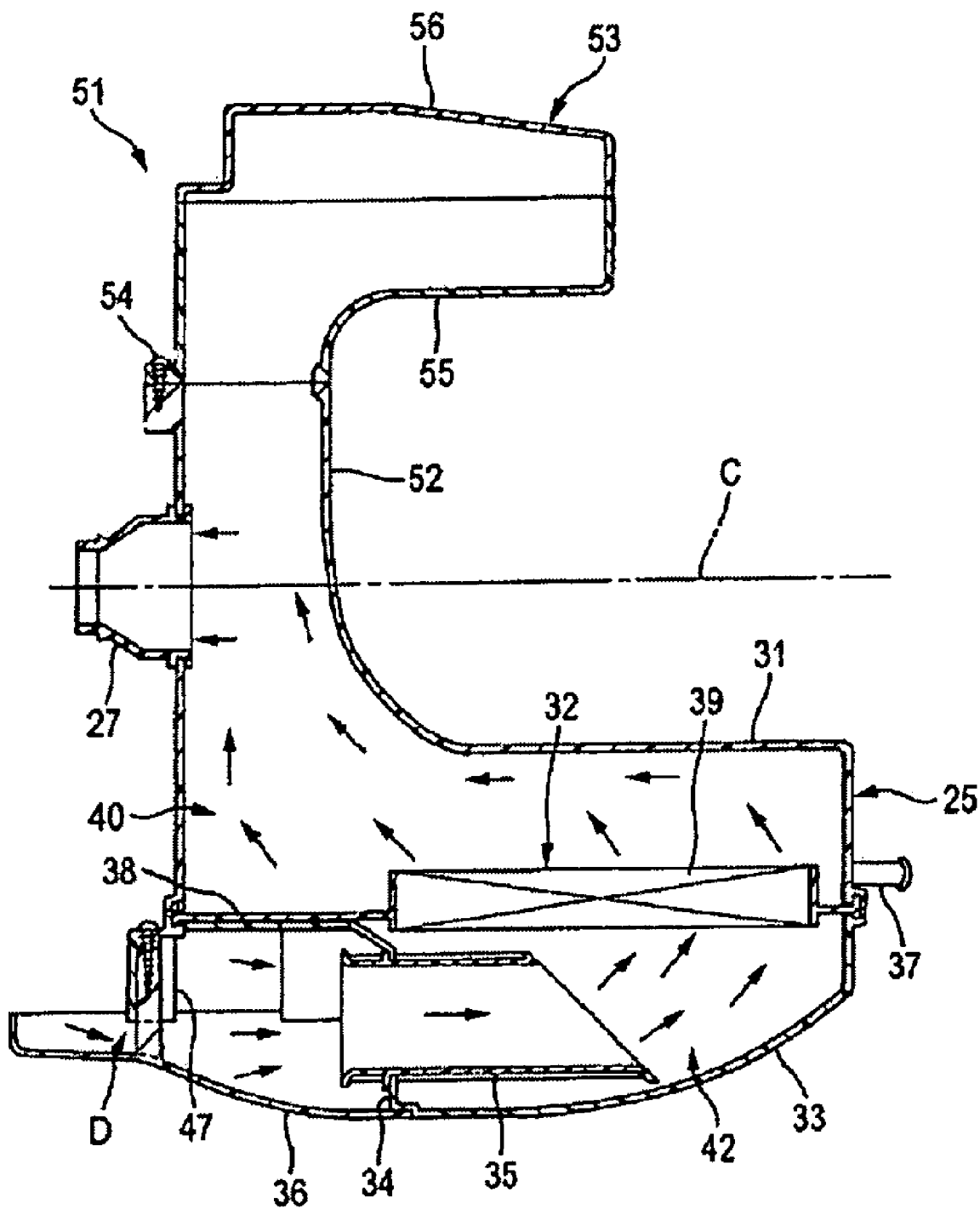
FIG. 5 is a horizontally cross-sectional view of a second embodiment in which a first air cleaner box and a second air cleaner box are formed integrally.
Figure 6:
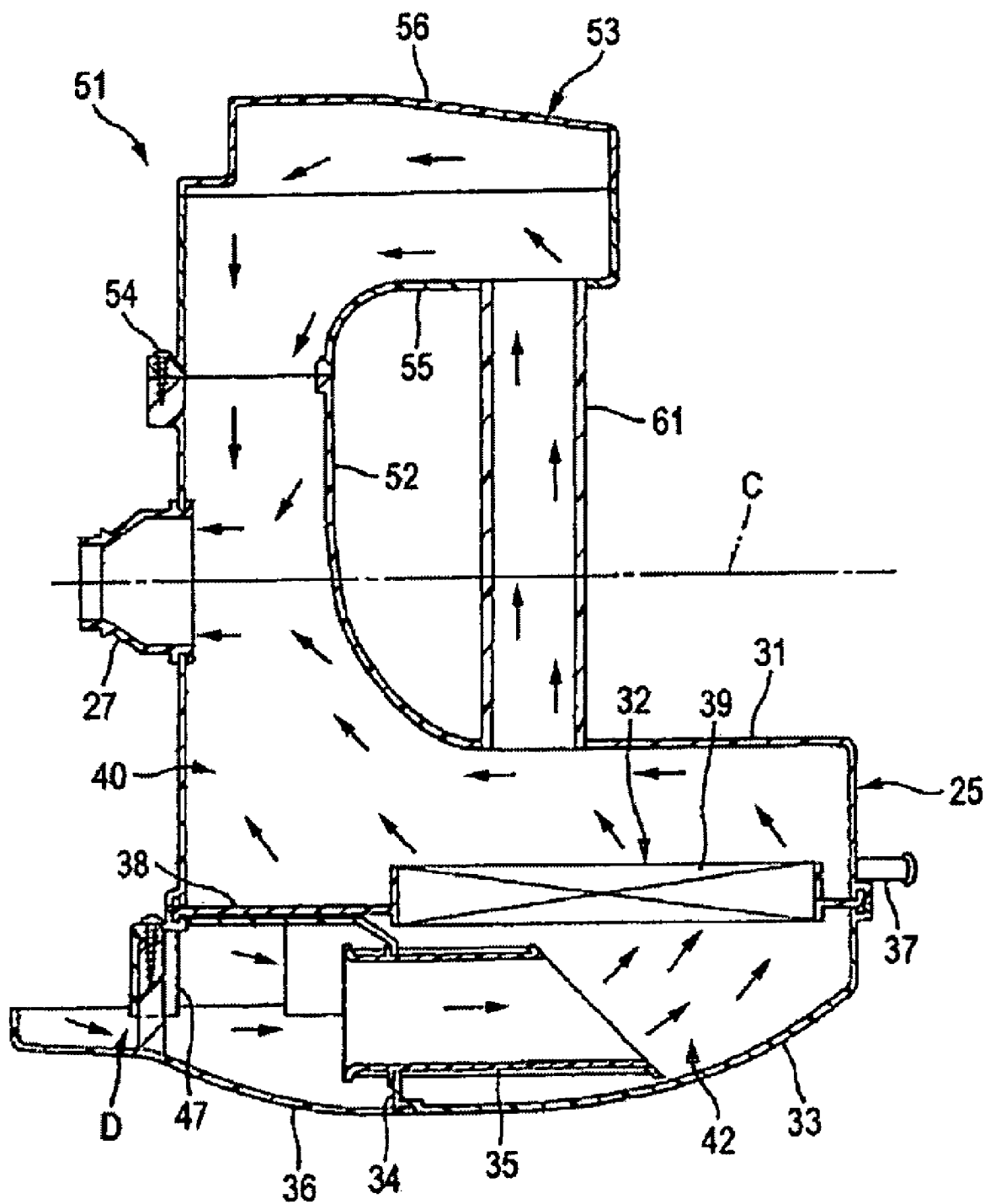
FIG. 6 is a horizontally cross-sectional view of a third embodiment in which a rear end portion of a second air cleaner box is made to communicate with a first air cleaner box.

FIGS. 5 and 6 illustrate second and third embodiments, respectively. These embodiments are common in many points to the first embodiment with respect to the construction and function. Then, a repeated description of these common points will be omitted by imparting common reference numerals on the drawings, and only different points will be described mainly. In addition, construction of respective portions of the respective embodiments may be combined variously in view of the function and advantage of the invention.

(Second Embodiment)

FIG. 5 illustrates a second embodiment.

In an air cleaner 51 shown in FIG. 5, a front portion of a downstream-side box 31 of a first air cleaner box 25 positioned on a left-hand side of the rear wheel extends rightward beyond a center line C of the scooter 7 in the transverse direction thereof, and a second air cleaner box 53 according to the embodiment is connected to a distal end portion of the extending portion 52. Of the first and second air cleaner boxes 25, 53, an air cleaner element 32 is provided only in the interior of the first air cleaner box 25. An intake duct 27 made up of a rubber pipe is attached to a front part of the extending portion 52 at a central portion thereof as viewed in the transverse direction of the scooter 7, and the air cleaner box is connected to a throttle valve 22, not shown, via the intake duct 27. Note that the same construction as that illustrated in FIGS. 1 to 4 is adapted to the other portions of the first air cleaner 25.

The second air cleaner box 53 is divided transversely so as to be made up of a left half portion 55 and a right half portion 56. The left half portion 55 is fixed to the extending portion 52 with a fixing screw 54, and the left and right half portions 55, 56 are secured to each other so as to define a closed space in the interior thereof. In addition, the second air cleaner box 53 is formed such that the shape and capacity are smaller than those of the first air cleaner 25.

(Third Embodiment)

FIG. 6 illustrates a third embodiment.

As shown in FIG. 6, while an air cleaner 51 according to this embodiment is constructed so as to have substantially the same construction as that of the second embodiment, a rear end portion of a second air cleaner box 53 of this embodiment is made to communicate with a first air cleaner box 25.

To be more specific, in the air cleaner 51 shown in FIG. 6, the second air cleaner box 53 and the first air cleaner box 25 are connected to each other via a communication pipe 61. This communication pipe 61 extends in the transverse direction of the scooter 7 and is connected to a downstream-side box 31 of the first air cleaner box 25 and a left half portion 55 of the second air cleaner box 53.

According to the air cleaners 51 according to the second and third embodiments illustrated in FIGS. 5 and 6, the capacity of the downstream-side air compartment 40 positioned downstream of the air cleaner element 32 in the first air cleaner box 25 is substantially increased by an amount equal to the capacity of the second air cleaner box 53. Due to this, since a large amount of air within the air cleaner boxes 25 and 53 can be supplied to the engine 3 without any resistance, when the opening of the throttle valve 22 is increased, the response of the engine 3 can be improved.

The invention claimed is:

1. A scooter-type motorcycle intake device, comprising:
a first air cleaner box provided on one side of a rear wheel above a transmission case of a unit-swinging power train unit; and
a second air cleaner box provided on the other side of the rear wheel,
wherein each of the first and second air cleaner boxes overlaps the rear wheel in a side view of the power train unit,
wherein air compartments of the air cleaner boxes are connected to a throttle valve while the air compartments of the air cleaner boxes are made to communicate with each other, and
wherein at least one of the first and second air cleaner boxes comprises an air cleaner element, and the first and second air cleaner boxes are communicated to each other on a downstream side of the air cleaner element.

2. The scooter-type motorcycle intake device as set forth in claim 1, wherein an air cleaner element is provided in each of the first air cleaner box and the second air cleaner box, and a fresh air inlet is formed in an air compartment upstream of the air cleaner element in each of the two air cleaner boxes, while an intake duct positioned between the two air cleaner boxes and extending from the throttle valve is connected to the air compartments of the air cleaner boxes downstream of the air cleaner elements.

3. The scooter-type motorcycle intake device as set forth in claim 2, wherein the intake duct connects the first and second air cleaner boxes to the throttle valve.

4. The scooter-type motorcycle intake device as set forth in claim 1, further comprising an intake manifold provided to extend rearward from a cylinder head.

5. The scooter-type motorcycle intake device as set forth in claim 4, further comprising an injector that supplies fuel and is mounted on the intake manifold.

6. The scooter-type motorcycle intake device as set forth in claim 1, wherein the first and second air cleaner boxes are symmetrical with each other viewed in a transverse direction of the scooter.

7. The scooter-type motorcycle intake device as set forth in claim 1, wherein the first and second air cleaner boxes are made up of a downstream-side box, an upstream-side box, an air pipe and an air inlet cover.

8. The scooter-type motorcycle intake device as set forth in claim 7, wherein the downstream-side box opens outwardly and an intake duct is attached to a front end portion of the downstream-side box.

9. The scooter-type motorcycle intake device as set forth in claim 8, wherein the intake duct is made of rubber and formed in a Y-shape.

10. The scooter-type motorcycle intake device as set forth in claim 9, further comprising a drain pipe provided at a rear end portion of the downstream-side box that discharges water.

11. A scooter-type motorcycle intake device, comprising:
a first air cleaner box provided on one side of a rear wheel above a transmission case of a unit-swinging power train unit; and
a second air cleaner box provided on the other side of the rear wheel,
wherein each of the first and second air cleaner boxes overlaps the rear wheel in a side view of the power train unit, and
wherein an air cleaner element is provided in the first air cleaner box, a fresh air inlet is formed in an air compartment upstream of the air cleaner element, and the air compartment downstream of the air cleaner element is made to communicate with the second air cleaner box, the second air cleaner box being formed such that an interior thereof constitutes a closed space.

12. The scooter-type motorcycle intake device as set forth in claim 11, wherein the second air cleaner box includes a left half portion and a right half portion.

13. The scooter-type motorcycle intake device as set forth in claim 12, wherein a shape and capacity of the second air cleaner box is smaller than the first air cleaner box.

14. The scooter-type motorcycle intake device as set forth in claim 12, wherein the left half portion is fixed to an extending portion by a screw.

15. A scooter-type motorcycle intake device, comprising:
a first air cleaner box provided on one side of a rear wheel above a transmission case of a unit-swinging power train unit; and
a second air cleaner box provided on the other side of the rear wheel,
wherein each of the first and second air cleaner boxes overlaps the rear wheel in a side view of the power train unit, and
wherein an air cleaner element is provided in the first air cleaner box, in that a fresh air inlet is formed in an air compartment upstream of the air cleaner element, and in that the air compartment of the first air cleaner box downstream of the air cleaner element is made to communicate with the second air cleaner box, the second air cleaner box being formed such that an interior thereof constitutes a closed space, and
wherein the first air cleaner box and the second air cleaner box are connected to each other via a communication pipe.

16. The scooter-type motorcycle intake device as set forth in claim 15, wherein the communication pipe extends in a transverse direction of the scooter.

17. The scooter-type motorcycle intake device as set forth in claim 15, wherein the communication pipe is connected to a downstream-side box.

18. The scooter-type motorcycle intake device as set forth in claim 17, wherein the downstream-side box is part of the first air cleaner box.

19. The scooter-type motorcycle intake device as set forth in claim 15, wherein the communication pipe is connected to a left half portion of the second air clear box.

20. The scooter-type motorcycle intake device as set forth in claim 15, wherein a capacity of the first air cleaner box is increased by an amount equal to a capacity of the second air cleaner box.

* * * * *